United States Patent [19]

Weston

[11] 4,193,791

[45] * Mar. 18, 1980

[54] CONCENTRATION OF HYDRATED ALUMINUM OXIDE MINERALS BY FLOTATION

[75] Inventor: David Weston, Toronto, Canada

[73] Assignee: Reynolds Metals Company, Richmond, Va.

[*] Notice: The portion of the term of this patent subsequent to Sep. 12, 1995, has been disclaimed.

[21] Appl. No.: 838,445

[22] Filed: Oct. 4, 1977

Related U.S. Application Data

[63] Continuation-in-part of Ser. No. 736,466, Oct. 28, 1966, Pat. No. 4,113,466.

[51] Int. Cl.² .................................................. B03D 1/02
[52] U.S. Cl. ................................................ 75/2; 209/5; 209/166; 241/20
[58] Field of Search ................ 209/9, 166, 167, 3, 209/5; 241/20, 24, 21; 75/2

[56] References Cited

U.S. PATENT DOCUMENTS

| | | | |
|---|---|---|---|
| 1,397,414 | 11/1921 | Everhart | 209/5 |
| 1,446,378 | 3/1923 | Borcherdt | 209/166 |
| 2,421,648 | 6/1947 | Pickens | 209/166 |
| 2,769,542 | 11/1956 | Russell et al. | 209/166 |
| 2,914,173 | 11/1959 | Le Baron | 209/166 |
| 2,944,666 | 7/1960 | Bunge | 209/5 |
| 3,097,162 | 7/1963 | Baarson et al. | 209/167 |
| 3,307,790 | 3/1967 | Cohn et al. | 241/5 |
| 3,339,730 | 9/1967 | Boutin et al. | 209/166 |
| 3,439,802 | 4/1969 | Mullary | 209/166 |
| 3,589,622 | 6/1971 | Weston | 209/166 |
| 3,630,351 | 12/1971 | Uhinck | 209/5 |
| 3,834,529 | 9/1974 | Hart | 209/166 X |
| 3,853,535 | 12/1974 | Mogyorosi et al. | 75/1 R |
| 3,859,207 | 1/1975 | Knocke et al. | 209/166 |
| 3,964,997 | 6/1976 | Weston | 209/166 |
| 3,979,282 | 9/1976 | Cundy | 209/166 |
| 3,990,965 | 11/1976 | Csillag et al. | 209/166 |

FOREIGN PATENT DOCUMENTS 2456104  6/1975  Fed. Rep. of Germany.

OTHER PUBLICATIONS

Runke, S. M. et al., Beneficiation of Ark. Bauxite, AIME Trans, N.Y. (2/44), pp. 218–226.
Runke et al., U.S. Bu. of Mines, RI 3709, (8/1946), pp. 1–25.
Chem. Abst. 70, 1969, 117205g, p. 160.
Chem. Abst. 82, 1975, 75813y, pp. 174 & 175.
Chemical & Metallurgical Engineering, Feb., 1944, pp. 205–206.
Runke, S. M., et al., U.S. Bureau of Mines Report of Investigations, R.I. 4440, Apr. 1949, pp. 1 to 38.
Gandrud, B. W. et al., U.S. Bureau of Mines Report of Investigations, R.I. 2906, Dec. 1928, pp. 1–8.
Clemmer, J. B., et al., U.S. Bureau of Mines Report of Investigations, R.I. 3586, Sep. 1941, pp. 1–26.

Primary Examiner—Robert Halper
Attorney, Agent, or Firm—Glenn, Lyne, Girard, Clark & McDonald

[57] ABSTRACT

A process for the concentration of hydrated aluminum oxide minerals from raw materials by flotation alone or in combination with magnetic separation using a series of conditioning steps prior to flotation involving dispersion, precipitation and flocculation.

13 Claims, 5 Drawing Figures

CONCENTRATION OF HYDRATED ALUMINUM OXIDE MINERALS BY FLOTATION

REFERENCE TO RELATED APPLICATIONS

This application is a continuation-in-part of my application Ser. No. 736,466, filed Oct. 28, 1966 and issued as U.S. Pat. No. 4,113,466 on Sept. 12, 1978.

BACKGROUND OF THE INVENTION

This invention is primarily applicable to the concentration by flotation of hydrated aluminum oxide minerals from such materials as Bauxites, Bauxitic Clays, and Laterites.

Heretofore the sole source of raw materials for the production of aluminum metal in the United States was Bauxites. The high grade hydrated aluminum oxide mineral concentrates produced by the present invention even from low grade raw materials, will now be able to satisfactorily replace Bauxite as feed to the Bayer process, which is universally the initial processing step in the manufacture of aluminum metal. Currently, American aluminum companies depend upon foreign sources for approximately 85% of the feed to their Bayer processes. Reserves of economically usable Bauxite in the United States are dwindling rapidly and the dependence on foreign sources is increasing accordingly. In the United States there are large tonnages of low grade hydrated aluminum oxide bearing materials for which heretofore no economic process existed for their use in making aluminum. For instance, there are reportedly several hundred million tons of hydrated aluminum oxide mineral-bearing laterites in the states of Oregon and Washington alone. With the application of the invention to this type of material an aluminum oxide concentrate can be produced that is at least equal in aluminum mineral content to Jamaican Bauxite, and at an appreciably indicated lower cost. Currently, Jamaican Bauxite is one of the major source supplies of the American aluminum industry. It is obvious that for the first time in a long number of years the process of the invention can place the United States aluminum industry in the position of being independent of foreign sources for their raw material requirements.

Research in concentration of Bauxites has been carried out by the U.S. Bureau of Mines over a long period of years. The published data from the U.S. Bureau of Mines is in the U.S. Bureau of Mines publications known as R. I.'s going back as far as 1927. In a pilot plant designed and intermittently operated by the U.S. Bureau of Mines from 1945 until about 1949, the circuit consisted of gravity concentration, flotation and magnetic cobbing of the final flotation concentrate. Both slimes and soluble salts proved to be major problems.

In the case of the slimes, everything possible was done to minimize their formation. Even under such conditions, where an ore tended to slime, either recovery and grade of concentrate produced or both were generally commercially unacceptable. No answer to the problem was found.

In the case of the soluble salts, zeolite-treated water was used in the flotation circuit to precipitate the soluble salts contained in the water supply.

The inventor has been informed that the only plant that has been placed in operation in recovering hydrated aluminum oxide minerals by flotation was in Guyana, which used screening and thorough desliming of the ore prior to flotation. Due to the fine grained nature of the United States deposit of low grade Bauxites, Bauxitic Clays and Laterites, if such a process was applied to any of these materials, the resulting loss of the hydrated aluminum oxide minerals contained in the slime fraction of the deslimed ores would be so high as to make the process uneconomic due to the resultant low recovery.

In the process of my invention, I have been able to obtain outstanding metallurgical results both as to recovery and grade of concentrates in treating low grade Bauxites and Bauxitic Clays from deposits located in the United States, using my flotation process either alone or in combination with magnetic cobbing.

No desliming of the ore is required prior to my flotation stages and most surprisingly the process can be carried out without prior treatment of the water used in the process. Similarly, in using essentially the same flotation circuit, the hydrated aluminum oxide minerals were successfully floated from United States Laterite deposits. To the inventor's knowledge, this is the first time that any process has been successfully applied to the concentration of the alumina bearing minerals from such deposits.

SUMMARY OF THE INVENTION

It is accordingly one object of the present invention to provide a method for the recovery of concentrates rich in hydrated aluminum oxide minerals from raw materials such as low grade Bauxites, Bauxitic Clays and Laterites. It will be understood that where economically applicable the process of the invention can be applied to high grade Bauxites to produce a highly purified hydrated aluminum oxide concentrate that may have special economical application.

A further object of the present invention is to provide a novel process for the recovery of concentrates of hydrated aluminum oxide minerals from low grade Bauxites, Bauxitic Clays and Laterites by a series of conditioning steps combined with flotation and, alternatively, combined with magnetic separation.

A still further object of the present invention is to provide a process for the concentration of hydrated aluminum oxide materials and their recovery from low grade Bauxites, Bauxitic Clays and Laterites by a series of steps including conditioning steps prior to flotation involving dispersion, precipitation and flocculation, and alternatively, flotation, combined with magnetic separation.

Other objects and advantages of the present invention will become apparent as the description thereof proceeds.

In satisfaction of the foregoing objects and advantages there is presented by this invention in its broadest concept a process for the concentration by flotation of hydrated aluminum oxide materials from hydrated aluminum oxide bearing materials such as those selected from the group of raw materials consisting of Bauxites, Bauxitic Clays and Laterites comprising: subjecting the said raw materials to at least three stages of conditioning prior to froth flotation, the said at least three stages of conditioning comprising: (a) a wet grinding circuit wherein the said grinding of the raw material is carried out in the presence of a dispersing agent, for example, a dispersing agent such as those selected from the group consisting of alkaline dispersing agents, lignins, phosphates and silicates; (b) a mechanical agitation condition circuit subsequent to the said wet grinding circuit in which the ground raw material is mechanically agitation conditioned in the presence of at least an alkaline dispersing agent selected from the group consisting of sodium hydroxide, potassium hydroxide, sodium carbonate, and mixtures thereof; (c) mechanically agitation conditioning the said ground raw material in the presence of a differential activating and flocculating agent selected from the group consisting of oxyhydryl anionic collectors; subjecting the said conditioned raw material to flotation to produce a rougher concentrate enriched in the said hydrated aluminum oxide minerals, and rougher tailings impoverished in the said hydrated aluminum oxide minerals. The hydrated aluminum oxides are primarily Gibbsite, the trihydrate, but monohydrates probably also occur in smaller or greater amounts, alone or together with Cliachite, which is probably a dihydrate.

In alternative embodiments of the present invention there are also provided additional purification steps by which the rougher concentrate is treated in a multistage cleaner circuit with cleaner tailings flowing countercurrently to produce a final flotation concentrate of the hydrated aluminum oxide minerals.

In a still further alternative the rougher tailings may be forwarded to waste and final tailings disposal or alternatively subjected to a fourth mechanical agitation conditioning stage or circuit followed by scavenger flotation to produce a scavenger concentrate enriched in hydrated aluminum oxide minerals and a scavenger tailings waste product.

In still additional alternative embodiments of the present invention, magnetic concentration stages may be incorporated following one or more wet grinding stages, or just prior to the second conditioning stage or used as a treatment for the final aluminum oxide concentrate to remove magnetically susceptible minerals therefrom.

The following will define for clarity various terms used in describing the invention:

Alkaline agents—an agent used to raise or maintain the pH of the pulp within certain optimum pH ranges. The alkaline agents used in this process are alkaline dispersing agents selected from the group consisting of sodium hydroxide, potassium hydroxide, sodium carbonate, and mixtures thereof as described herein. In the process of this invention, the alkaline dispersing agents also bring about changes to the surfaces of the aluminum oxide minerals in combination with the other features of the invention, which on the subsequent addition of the activation and flocculation agent, has the effect of causing such agent to differentially activate and flocculate the hydrated aluminum oxide minerals. At the optimum pH ranges, the alkaline agents are also effective to precipitate salts from the pulp which are contained in the original water supply and raw materials themselves, and thus enhancing the subsequent differential activation and flocculation of the hydrated aluminum oxide minerals on the addition of the differential activating and flocculating agent and thus in combination with the other features of the invention, result in comparatively high recovery and concentrate grade of the hydrated aluminum oxide minerals. The alkaline agents described for use in the present invention are those found to be economically advantageous in conducting the process.

Dispersing agents—families of dispersants as described herein such as lignins, phosphates, or silicates, or any other family of specific dispersants which may be economically used to disperse the solids contained in the pulp of the raw materials. The purpose of the dispersing agent in the wet grinding circuit of the invention is to effectively and beneficially disperse the solids contained in the pulp of the ground raw materials to obtain conditions wherein the solids do not stick to the grinding media or liners thus allowing for maximum grinding efficiency. The dispersing agent must also be so chosen that, while achieving this condition, it, in combination with the alkaline dispersing agent, either used in combination, or in subsequent mechanical agitation conditioning stages, beneficially affects the surfaces of the hydrated aluminum oxide minerals so that when the collector is added in a further subsequent stage, the hydrated aluminum oxide minerals are differentially activated and flocculated so that in subsequent flotation, both comparatively high recovery and concentrate grade of the hydrated aluminum oxide minerals are achieved. The dispersing agents can be used along in the grinding circuit stage or can be used in conjunction with the alkaline dispersing agents in the grinding circuit stage, but can be only used in conjunction with the alkaline dispersing agents in the two at least subsequent specified stages of the process.

Effectively and beneficially disperse the solids—when dispersion of the solids in the pulp in the wet grinding circuit stage is carried out to achieve optimum grinding efficiency, the particular dispersing agent and amount used, alone or in combination with an alkaline dispersing agent, will be such as to effectively disperse the solids contained in the pulp. The dispersing agent must also be selected to act in combination with the alkaline agent present in at least one subsequent mechanical agitation conditioning stage to beneficially affect the surfaces of the hydrated aluminum oxide minerals so that on subsequent addition of a collector, differential activation and flocculation of the hydrated aluminum oxide minerals are achieved, which in subsequent flotation, will result in both high recovery and acceptable grade of concentrate of the hydrated aluminum oxide minerals.

Sufficient period of time to precipitate salts—this expression is normally applied to the second stage of the minimum three stage conditioning circuit in determining the optimum pH range in which the salts will precipitate and with the maximum beneficial effect on the surfaces of the hydrated aluminum oxide minerals. To determine the optimum sufficient period of time this is determined by results obtained from gradually increasing the periods until no further increase in recovery of the hydrated aluminum oxide minerals is shown in the rougher flotation circuit. At such point the maximum sufficient period of time will have been determined.

DESCRIPTION OF THE PREFERRED EMBODIMENTS

I have found that by the use of a minimum of three carefully controlled conditioning steps, with the addition of at least one dispersing agent to the first step, an alkaline agent to at least the second step and at least one fatty acid collector to the third step prior to initial flotation, good recovery and grade of aluminum oxide mineral concentrate can be achieved.

In using the preferred embodiment of my invention, at least the final stage of wet grinding the materials is the first conditioning stage. Where a two or three stage grinding circuit is used I prefer to add my first reagent to the intake end of the first grinding mill. By this means, not only do the flotation characteristics of the aluminum oxide minerals improve but also the grinding efficiency is vastly improved, resulting in high tonnage output from the grinding units with resultant low power consumption. The wet grinding circuit may use any type of wet grinding mill that will either by itself, or in combination with one or more additional wet grinding mills, either in open or closed circuit, with a classifier or screen, effectively reduce the raw material as fed either from the mine or through any means of pre-reduction in feed size to flotation feed size.

The reagents added to the grinding circuit are at least one agent selected from the group consisting of alkaline agents and dispersing agents. The alkaline agent is used to raise or maintain the pH of the pulp within certain alkaline pH ranges. The alkaline agents also act as dispersing agents and precipitating agents and are preferably selected from the group consisting of NaOH, KOH, $Na_2CO_3$, and mixtures thereof. The amounts of alkaline agent employed are limited or controlled by the optimum pH points as determined in at least the three conditioning stages.

The pH of the pulp discharging from the grinding circuit is at an optimum pH point and in the pH range of about 6.5 to 12.5. The optimum pH point depends upon the natural pH characteristics of the pulp resulting from grinding of the raw material and upon the dispersing agent used and/or the alkaline agent used. The optimum pH point is a pH point chosen to be the mean at which the pH can be reasonably controlled in plant practice. For instance, if a pH of 10.0 is taken as the optimum pH point, in plant practice the desired pH range will be approximately 10.0 plus or minus 0.2.

In using my preferred circuit the alkaline agent is NaOH and the optimum pH range is in the range of about 8.5 to 11.5.

In this invention, the addition of a dispersing agent to the grinding circuit is not only a factor in both the recovery of the aluminum oxide minerals and in the final grade of concentrate, but also serves as a major factor in increasing grinding efficiency. The dispersing agent can be any dispersing agent which will serve to disperse the solids in the pulp to achieve the necessary free flow characteristics and in the subsequent flotation, will beneficially affect the flotation characteristics of the hydrated aluminum oxide minerals. My preferred dispersing agent is selected from the family of lignins in which I may use one alone, or mixtures from the same family, or combined with one or more members of those families of dispersants such as the phosphates and silicates. The lignins comprise a well known family of dispersants such as Quebracho, which is a bark extract produced in South America, as well as lignin compounds such as lignin sulphonate. These lignins are dispersants and are marketed by such companies as Crown Zellerbach and ITT Rayonier Products. It will be understood that in this first stage I may use an alkaline agent alone, a dispersing agent alone, or a combination of the two. The amount of dispersing agent used may vary from zero to about three pounds per metric ton of raw material used.

The number two conditioning stage is a mechanical agitation conditioning stage usually involving a series of at least two agitators in which the pulp from the grinding circuit flows through the agitators in series. Such an arrangement of agitators is shown and described in my U.S. Pat. No. 3,919,079 and the disclosure of said agitator arrangement is specifically incorporated herein by reference. The pH in the first agitator is adjusted with an alkaline agent to an optimum pH point in the range of about 7.5 to 13.0. The pulp residence time in this series of agitators is in the range of about five minutes to one hour. Where I use NaOH alone as the alkaline agent, the optimum pH point is in the range of about 9.5 to 11.5. Where I use $Na_2CO_3$ alone or in combination with NaOH, the pH range is about 7.5 to 11.0. The percent solids of the pulp is in the range of about 15 to 40%. My preferred pulp residence time is 25 to 45 minutes, and the preferred percent solids 20 to 35%. In all references to residence times, I am referring to the residence times of the solids contained in the pulp.

The effect of the alkaline agent and optionally the dispersant in this stage without the presence of collector is not fully understood; however, one major function of the alkaline agent is to act as a precipitant for solid deleterious salts contained both in the water supply and the raw materials themselves.

The number three conditioning stage involves addition of at least one or more collectors selected from the group of oxyhydryl anionic collectors. This group of collectors is described in "Flotation" by A. M. Gaudin, published by McGraw-Hill Book Company, New York, 1957, pages 185, 186 and 187. My preferred sub-group is the fatty acids consisting of such commercial products as oleic acid, crude oleic acid, tall oil, a by-product of the pulp and paper industry, neo-fats, products produced by the refining of animal fats and various types of fish oil. The addition of the fatty acid activates and differentially flocculates the hydrated aluminum oxide minerals which, when followed by flotation, produces a rougher concentrate normally containing in excess of 80% of these minerals. In my preferred circuit, I have found that normally a single fatty acid will produce commercially acceptable results, although I may use two or more in combination.

The conditioning time in this stage will vary from a minimum of about 2.0 minutes to 45 minutes. Where I use a low period conditioning, that is less than six minutes, I produce a comparatively high grade rougher concentrate, and in some cases to obtain sufficiently high recovery it is necessary to follow this initial flotation stage by a mechanical agitation conditioning stage applied to the rougher tailings which will vary from about five minutes to 30 minutes with additional collector added to the pulp and in some cases, I may also add alkaline agent, and/or dispersant. A scavenger flotation stage is used on this product to produce a scavenger concentrate which I normally return to the head of the rougher flotation circuit or to the number one cleaner circuit, and a scavenger tailings which form the final tailings to waste.

Where a third conditioning stage is in excess of about six minutes residence time of the ground material, the rougher flotation stage following may not require a scavenging flotation stage and thus the rougher tailing will be the final tailings to waste.

The rougher concentrate is normally treated in a three or four stage conventional cleaner circuit with the cleaner tailings flowing countercurrently; for instance, if a three stage cleaner circuit is used the third cleaner tailings will be returned to the head of number two cleaner circuit, the second cleaner tailings to the head of the first cleaner circuit, and the first cleaner tailings to either the head of the rougher flotation circuit or to an agitator in the conditioning circuit ahead of the rougher flotation circuit.

One of the most surprising results from this invention is that in treating Bauxites, Bauxitic Clays and Laterites, they all respond to the same above described process. Such results would indicate that the invention is basic with broad applications, rather than a specialized type of process applicable to only one type of material.

Where I combine magnetic concentration with my flotation process, I prefer to magnetically cob the original material at one or more points in the circuit. To the inventor's knowledge, all raw materials containing hydrated aluminum oxide minerals contain various percentages of iron oxides and/or carbonates, herein referred to as iron oxides, titanium oxides, and in some cases mica, which may be in the form of biotite and thus respond to magnetic concentration with removal prior to flotation. The conventional process for producing a high grade alumina product from raw materials is the Bayer process and one of the family of minerals that interfere with this process is too high a concentration of the iron oxides. At least a percentage of the iron oxides and titanium oxides will float with the hydrated aluminum oxide minerals and tends to reduce the grade of the final concentrate. The mica in its various forms normally contains potassium which has a detrimental effect in part of the aluminum metal production process. For these reasons magnetic cobbing of some materials can be quite important.

The minerals described above require high magnetic intensity for their removal. The major weakness in using high intensity is that a low density pulp is required to provide both high recovery and the obtaining of a magnetic product that contains a low percentage of the aluminum oxide minerals. Surprisingly, I have found that the addition of a dispersing agent to the grinding circuit and/or an alkaline agent producing optimum conditions for my flotation circuit, also produces outstanding results in the magnetic removal of the unwanted minerals when such a prepared pulp of the raw material is fed to a magnetic cobbing stage ahead of flotation. The pulp of the ore from either the first or second stage of grinding, (where I use a two stage grinding circuit) shows excellent results from feeding the magnetic cobbers prior to flotation at pulp densities in excess of 25% solids. For instance, in treating a Bauxite containing approximately 7% $Fe_2O_3$, and 2% $TiO_2$, and wherein the iron minerals were mainly in the form of siderite, and the titanium minerals mainly in the form of ilmenite, a magnetic concentrate was produced containing 10% of the original weight of the ore and only 2% aluminum oxide minerals.

The alternate use of magnetic cobbing is on the final flotation concentrate. In such case, I reduce the pH of the flotation concentrate from the range of about 7.5 to 13.0 and where necessary to within the pH range of about 6.5 to 10.5 with sulphuric acid and disperse the concentrate with preferably sodium silicate or metasilicate or one of the members of the phosphate group of dispersants prior to feeding the concentrate to a magnetic cobbing unit. My preferred dispersant in the phosphate group is tetrasodium pyrophosphate.

BRIEF DESCRIPTION OF THE DRAWINGS

Reference is now made to the drawings accompanying the present application where it will be seen that.

DETAILED DESCRIPTION OF THE DRAWINGS

Figure 1:
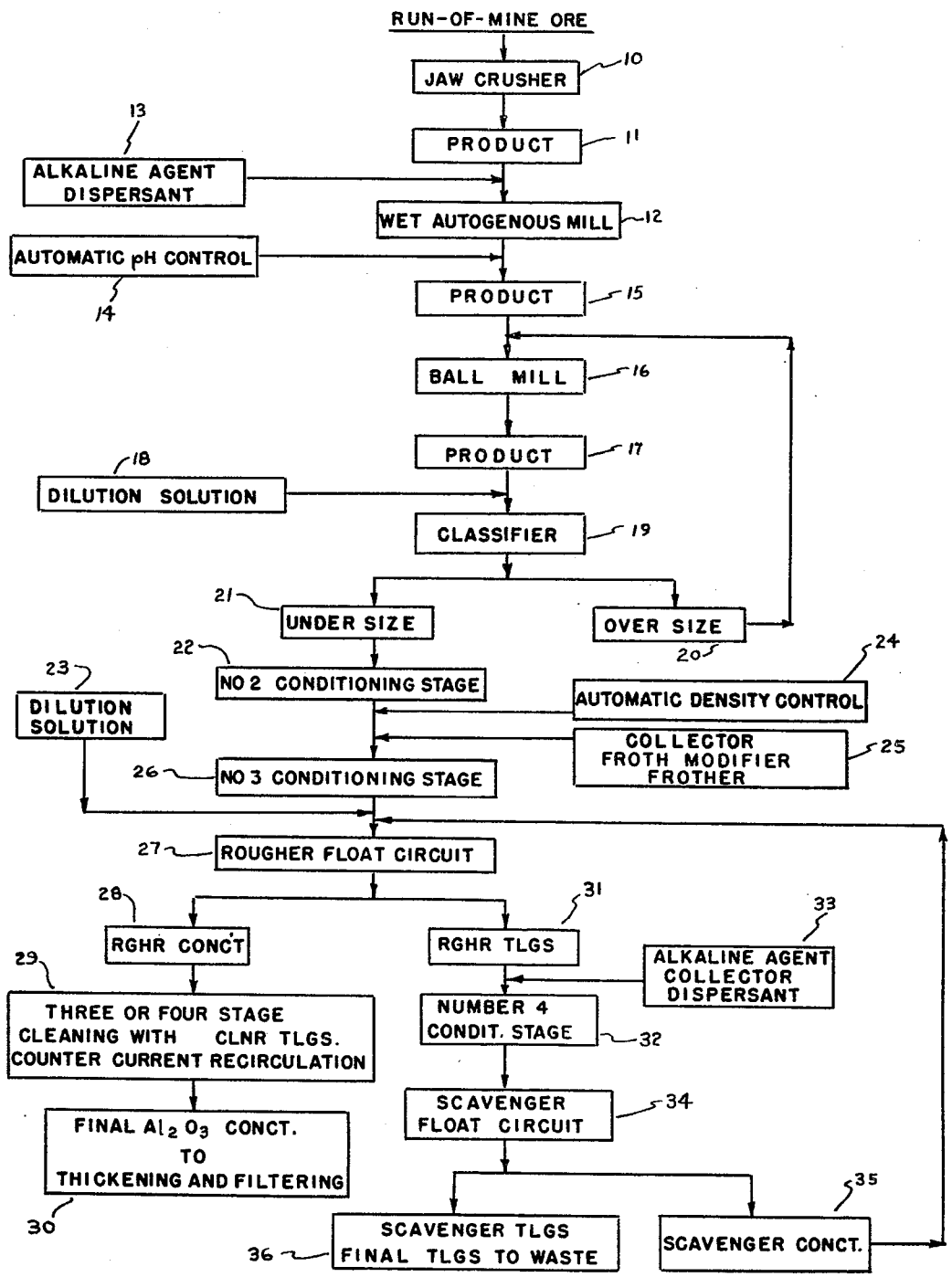
FIG. 1 shows a flow sheet of the present invention directed to a most preferred embodiment thereof.

FIG. 1 shows the preferred flow sheet of the invention using flotation alone. The run-of-mine ore is fed to a jaw crusher 10 and the product 11 is fed to a wet autogenous grinding mill 12. At the wet autogenous grinding mill discharge, I record the pH at 14 and automatically control the pH by adjusting addition of the alkaline agent from 13 at a predetermined optimum pH point. The product 15 is fed to a wet grinding ball mill 16 and the product 17 diluted with mill solution 18 prior to being fed to classifier 19. The oversize 20 from the classifier would normally be fed back to the head of ball mill 16. The undersize 21 is fed to number two conditioning stage at a density of about 20 to 40% solids. Following number two conditioning stage 22, the pulp flows to number three conditioning stage 26 and collector 25 is added to this stage together with modifier and frother if required. Following the number three conditioning stage the pulp is diluted with solution 23 adjusted with an alkaline agent to the same pH and the amount automatically controlled with automatic density control 24 to dilute the pulp to an optimum density point within the range of about 12 to 18% solids prior to the rougher flotation circuit 27. The rougher flotation circuit produces the rougher concentrate 28 and the rougher tailings 31. To the rougher tailings an alkaline agent, collector and dispersant 33 are added and the pulp fed to number four conditioning stage at 32. The pump from 32 is fed to the scavenger flotation circuit 34. This circuit produces two products, the scavenger tailings which are final tailings and sent to waste at 36. The scavenger concentrate 35 would normally be fed back into the head of the rougher flotation circuit at 27. The rougher concentrate is fed at 29 to a three or four stage cleaner circuit with cleaner tailings countercurrent recirculated. There are two alternatives (not shown) to the cleaner circuit. In the first alternative the number one cleaner tailings instead of going to either the number three conditioning stage of final tailings would flow to a mechanical agitation conditioning circuit to which collector is added and the conditioned pulp subjected to flotation to produce a scavenger cleaner tailing which would be discharged to waste and a scavenger cleaner concentrate which would be fed to the head of number two cleaner circuit.

The second alternative is to feed the number one cleaner tailing to number four conditioning stage. The final cleaner concentrate 30 contains the concentrated hydrated aluminum oxide minerals and would normally flow to thickening and filtering (not shown) with the filter cake forming the final concentrated product for treatment to produce pure aluminum oxide or aluminum alloy products.

Figure 2:
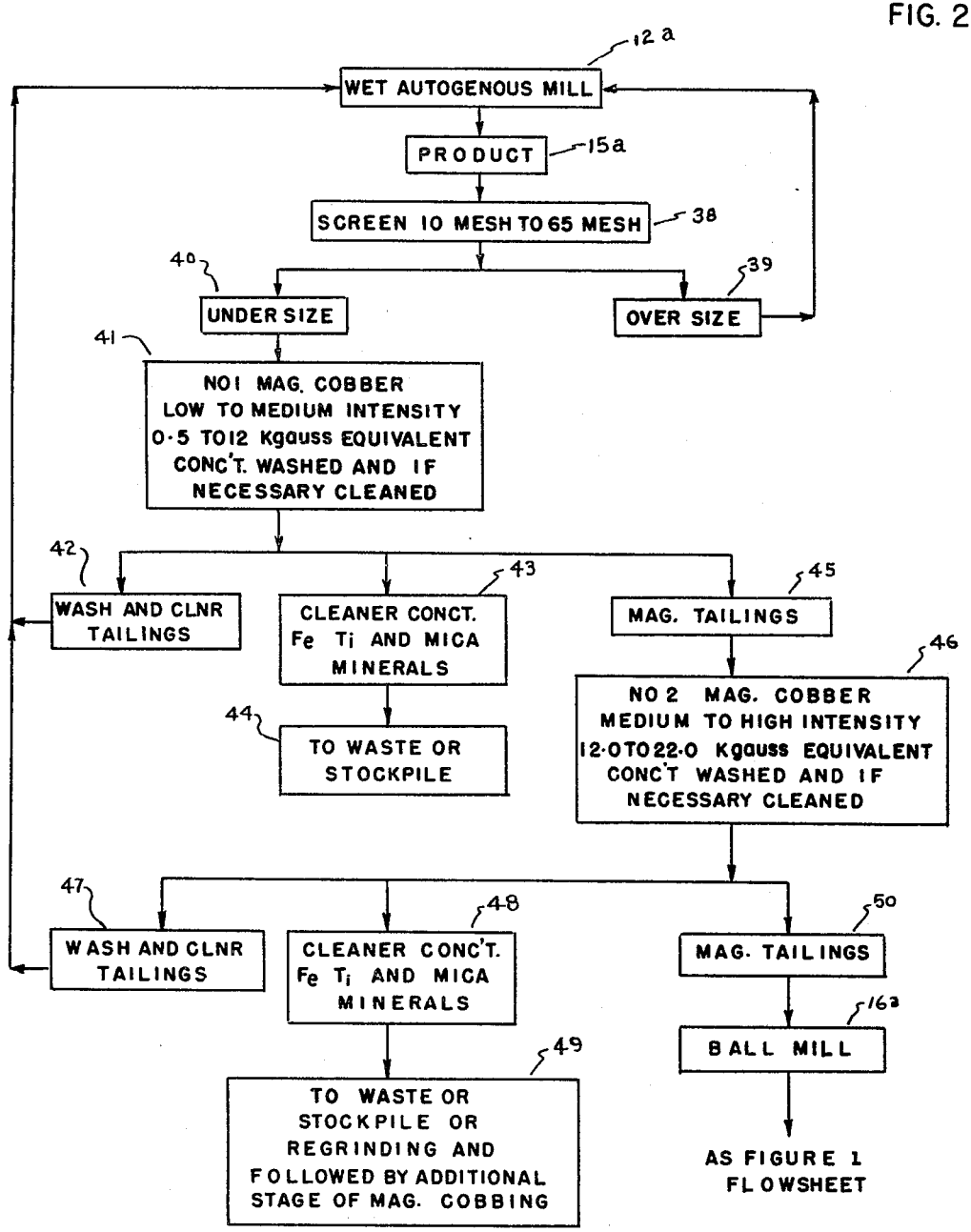
FIG. 2 shows a preferred aspect of the invention which includes magnetic cobbing circuits subsequent to the initial grinding stage.

FIG. 2 shows the preferred flow sheet of the invention incorporating magnetic cobbing following primary grinding. The flow sheet to the wet autogenous mill 12a is the same as shown on sheet 1 to the wet autogenous mill 12 and the product 15a is the same product as shown on sheet 1, product 15. The product 15a is fed to a screening circuit 38 using 10 mesh to 65 mesh screens with the oversize 39 returned to the wet autogenous mill 12a. The undersize 40 is preferably fed to number one magnetic cobbing stage 41 using low to medium intensity in the range of 0.5 to 12 kilogauss equivalent with the concentrate washed and if necessary cleaned. The term equivalent is used with high intensity as it is difficult to obtain a true magnetic intensity of the field due to the variation depending upon the contour design of the magnetic faces. This stage 41 will normally produce three products. The first, 42 is the wash and cleaner tailings which are preferably returned to the wet autogenous mill 12a as both make up solution for the grinding unit and further reduction in middling particles. The second product, the cleaner concentrate containing the iron, titanium and mica minerals would be either sent to waste at 44 or stock piled for further treatment in the separation of the iron and titanium minerals to produce commercially saleable products of one or more of these minerals. The third product, the magnetic tailings 45, will contain the bulk of the aluminum oxide minerals and also the more difficult recoverable iron, titanium and mica minerals. The product is fed to the number two magnetic cobber stage at 46 wherein medium to high intensity is used in the range of 12.0 to 22.0 kilogauss equivalent. The concentrate is washed and if necessary cleaned. Three products will be produced from this stage with the first product 47 being the wash and cleaner tailings which would normally be returned to the wet autogenous mill at 12a. The second product, the cleaner concentrate at 48 will contain iron, titanium and mica minerals and will either be sent to waste at 49 or stock piled or alternately reground and followed by additional stage of magnetic cobbing to release the aluminum minerals that may be tied up as middling particles. A third product, the magnetic tailings at 50 will contain the bulk of the aluminum oxide minerals and be impoverished in iron, titanium and mica minerals. This product is fed to a ball mill 16a as in flow sheet 1 and follows flow sheet 1 from this stage.

Figure 3:
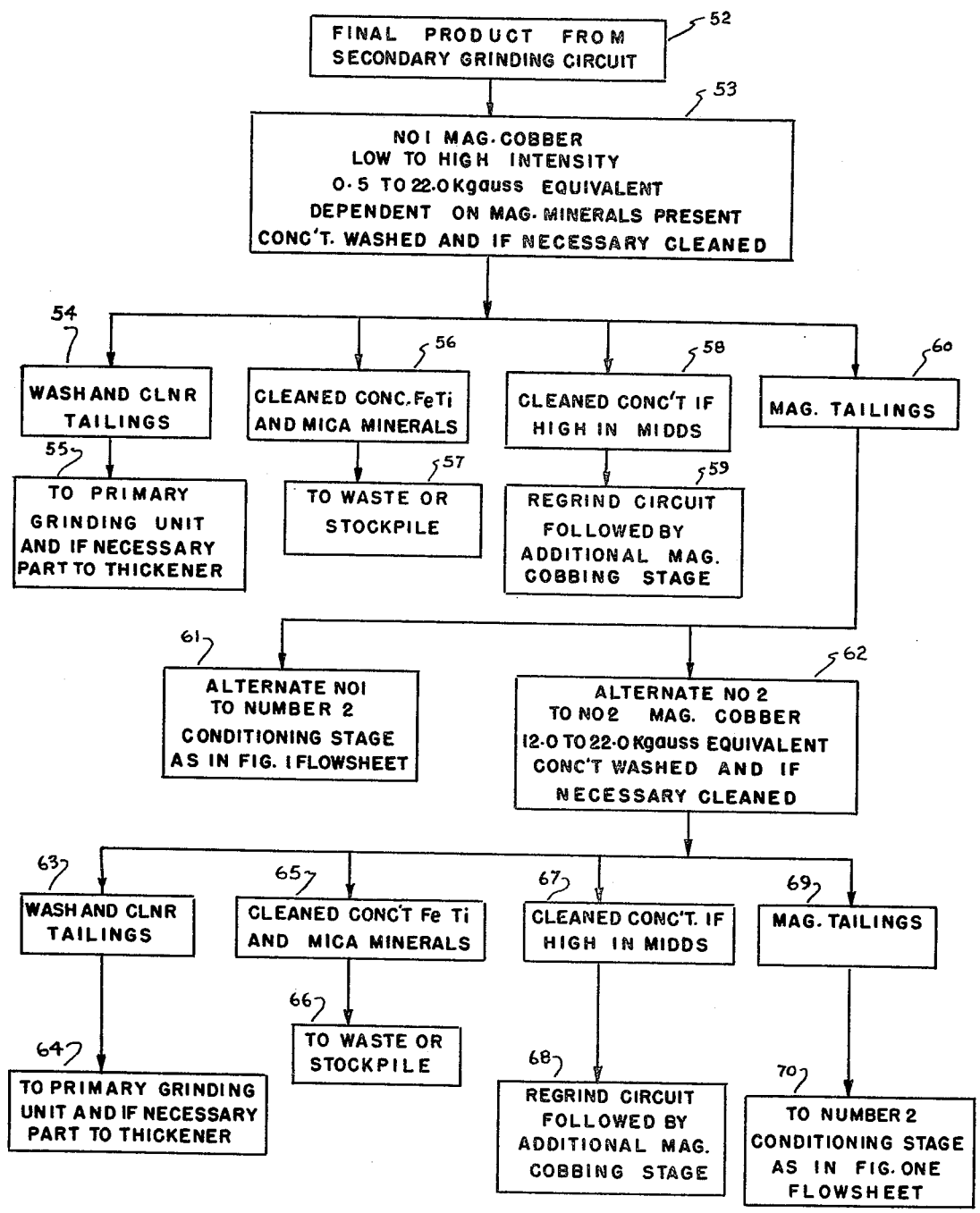
FIG. 3 shows an alternative aspect of the present invention wherein a magnetic cobbing circuit is incorporated prior to the Number 2 conditioning stage.

FIG. 3 shows the preferred flow sheet of the invention incorporating the magnetic cobbing following secondary grinding. The final product from the secondary grinding circuit 52 is the same as the classifier underside product 21 shown on sheet 1. This product is fed to the number one magnetic cobber stage at 53 using low to high intensity magnetic fields in the range of 0.5 to 22 kilogauss equivalent, and will be dependent on the magnetic minerals present. The magnetic concentrate would normally be washed and if necessary cleaned. This stage will normally produce three products. The first, 54, which is the wash and cleaner tailings would be fed directly to the primary grinding unit 55, referred to in sheet one as a wet autogenous mill 12. If the dilution is too high it may be necessary to thicken this product prior to feeding it to the primary grinding unit. The thickener is not shown. The second product, 56, is the cleaned concentrate containing iron, titanium and mica minerals and, if low in middling particles would be fed to either waste or a stock pile 57. If this cleaned concentrate is high in midds, shown at 58, it would be fed to a regrind circuit at 59 and the product from the regrind circuit treated by an additional magnetic cobbing stage.

The third product, the magnetic tailings at 60 will contain the bulk of the aluminum oxide minerals and be impoverished in the iron, titanium and mica minerals. The treatment of this product has two alternatives. The alternate number 1 at 61, is fed to the number two conditioning stage as shown in FIG. 1 at 22. Alternate number two is a number 2 magnetic cobbing stage using 12 to 22 kilogauss equivalent with the concentrate washed and if necessary cleaned. If this alternate 62 is used it will produce three products with the first product at 63 being the wash and cleaner tailings which is fed to the primary grinding unit at 64 and if necessary part to a thickener which is not shown. The second product, the cleaned concentrate at 65 will contain, iron, titanium and mica materials which would be sent to waste or stock piled at 66. If the cleaned concentrate 65 contains an appreciable quantity of middling particles as shown at 67 it is fed to a regrind circuit 68 with the product from the regrind circuit treated by an additional magnetic cobbing stage. The third product, the magnetic tailings at 69 is fed to the number two conditioning stage 22 as shown in FIG. 1 flow sheet.

Figure 4:
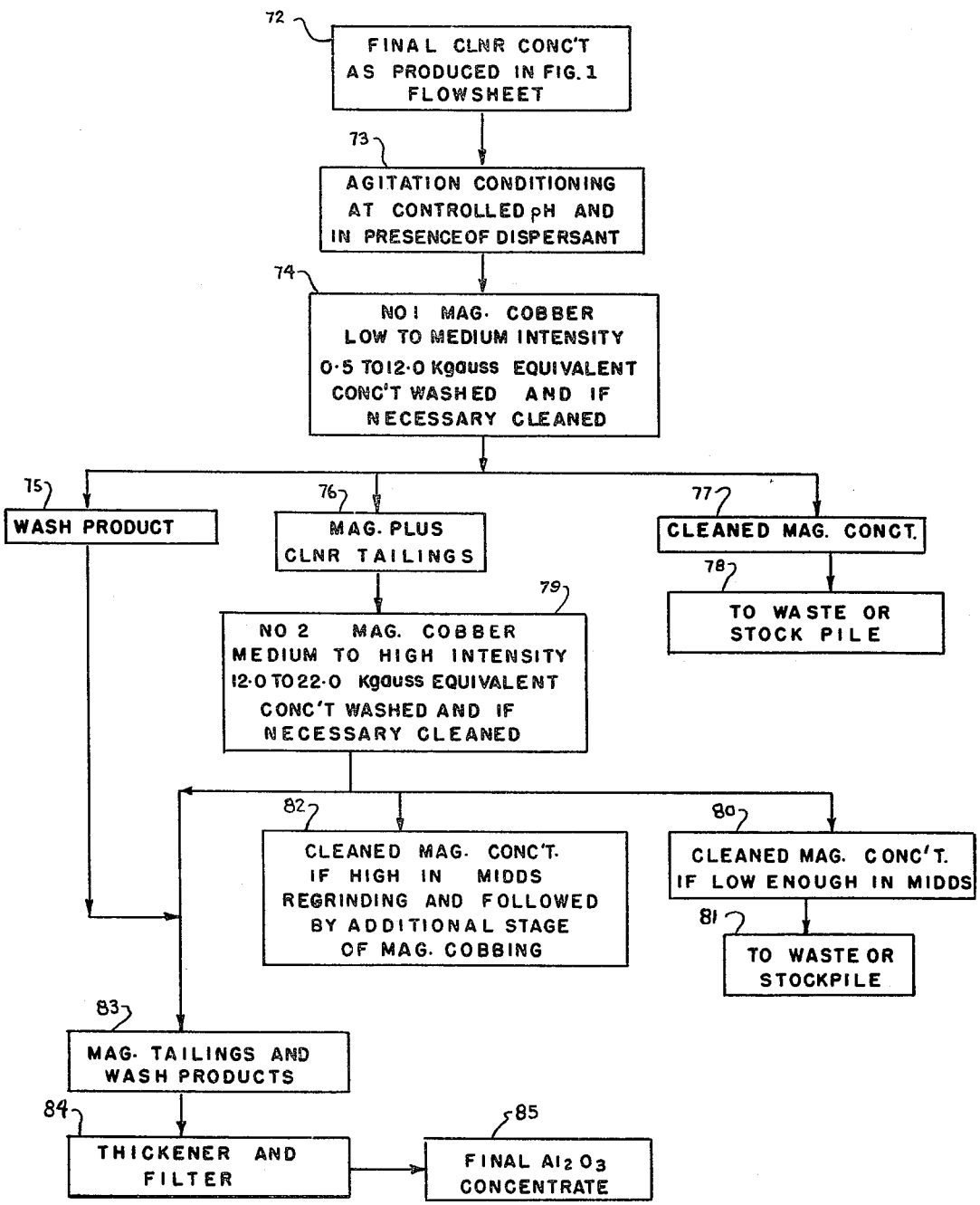
FIG. 4 shows an alternative aspect of the present invention wherein a magnetic cobbing circuit follows the aluminum oxide concentrate recovery stage.

FIG. 4 shows the preferred flow sheet of the invention incorporating magnetic cobbing on the final flotation cleaner concentrate. The final cleaner concentrate 72 is the same concentrate as shown in FIG. 1 at 30 prior to thickening and filtering. The concentrate from the final cleaner stage 72 is fed to an agitation conditioning tank at 73 at a controlled pH and in the presence of dispersant. The preferred pH range is 6.5 to 10.5 and is controlled in this range by the addition of sulphuric acid. The preferred dispersants are from the group consisting of sodium silicates and phosphates. The pulp from the conditioning stage 73 is fed to number one magnetic cobbing stage at 74 using low to medium intensity in the range of 0.5 to 12 kilogauss equivalent. The concentrate is washed and if necessary cleaned. Three products are produced from this stage. The first, the wash product 75 is fed to a thickener and filter 84 and forms part of the final aluminum mineral concentrate at 85. The second product 76 is the magnetic tailings plus the cleaner tailings which are fed to the number two magnetic cobber stage 79 with medium to high intensity in the range of 12.0 to 22.0 kilogauss equivalent with the magnetic concentrate washed and if necessary cleaned. From this number two magnetic cobber stage three products are produced with the first product the magnetic tailings and wash products 83 fed to the thickener 84 to produce part of the final aluminum mineral concentrate 85. The second product is the cleaned magnetic concentrate 80 and if low enough in middling particles is sent to either waste or stock pile at 81. If the cleaned magnetic concentrate 82 is high in midds this product is sent to regrinding and the product from the regrind circuit treated by an additional stage of magnetic cobbing. The reground mill product and the additional stage of magnetic cobbing are not shown.

Figure 5:
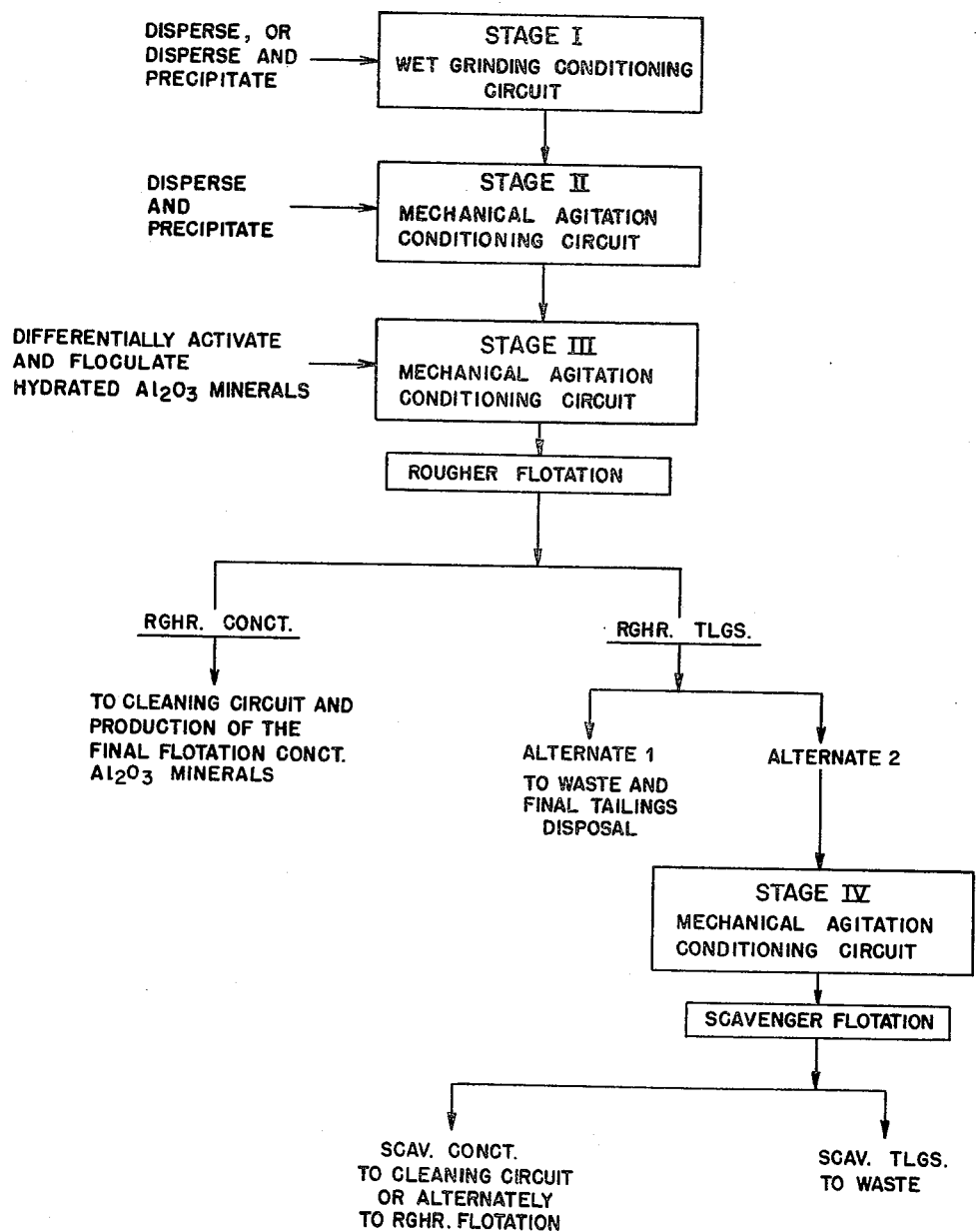
FIG. 5 shows the broadest concept of the process of the invention.

FIG. 5 is a simplified version of the invention. In Stage I the solids in the pulp of the ground raw material are dispersed by one of the following means:
(1) The addition of a dispersing agent alone preferably selected from the group of dispersing agents consisting of lignins, phosphates and silicates;
(2) the addition of an alkaline agent alone preferably selected from the group consisting of NaOH, KOH and $Na_2CO_3$; or
(3) the combination of agents selected from the group of dispersing agents and alkaline agents.

Stage II must have present an alkaline agent, and preferably one selected from the group of alkaline agents consisting of NaOH, KOH and $Na_2CO_3$. This stage is preferably adjusted to an optimum pH point within the pH range of about 7.5 to 10.5 using $Na_2CO_3$ alone, 8.5 to 11.0 using $Na_2CO_3$ in combination with NaOH or KOH, and 9.5 to 11.5 using NaOH or KOH alone.

Stage III must have present an agent selected from the group of activating and flocculating agents selected from the group consisting of oxyhydryl anionic collectors, and at least one or more of the fatty acids selected from the group consisting of oleic acid, crude oleic acid, tall oils, fish oil and mixtures thereof, with the pH adjusted to an optimum pH point in the range of about 7.5 to 13.0.

The pulp from the Stage III conditioning circuit is normally then subjected to rougher flotation in accordance with means known to the art from which recovered a rougher concentrate and rougher tailings. The rougher concentrate is rich in the desired hydrated aluminum oxide minerals. In the preferred embodiment of FIG. 5, the rougher concentrate is passed to cleaning circuits for production of the final flotation concentrate containing the hydrated aluminum oxide minerals.

The rougher tailings may be treated by either of two alternative procedures. In one alternative, the tailings may be passed to waste and final tailing disposal. In the second and preferred alternative the tailings are subjected to a Stage IV mechanical agitation conditioning circuit wherein there is present at least an activating and flocculating agent selected from the group of fatty acids.

Stage IV must have present an agent selected from the group of activating and flocculating agents selected from the group consisting of the oxyhydryl anionic collectors, and at least one or more of the fatty acids selected from the group consisting of oleic acid, crude oleic acid, tall oils, fish oil, and mixtures thereof.

In addition, it may have the following:
(1) The addition of an alkaline agent and at least one or more of those selected from the group consisting of NaOH, KOH, $Na_2CO_3$, and mixtures thereof for upward adjustment of pH.
(2) The addition of an acid agent such as mineral acid, preferably $H_2SO_4$, for downward adjustment of pH.
(3) The addition of a dispersing agent and preferably one or more of those selected from the group consisting of lignins, phosphates and silicates.

Subsequently, the mixture is subjected to scavenger flotation to recover a scavenger concentrate and waste scavenger tailings. The scavenger concentrate may be cycled to the cleaning circuits or alternatively to rougher flotation.

EXAMPLES OF THE OPERATION OF THE INVENTION

In all of the following examples of the ore as received was air dried for ease of handling and put through a hammer mill to produce a product that was approximately minus ¼ inch. Grinding was carried out in a laboratory rod mill and the product to flotation varied between 55% to 95% minus 500 mesh. No desliming was employed. Tap water was used throughout all of the tests, and in chemical analysis contained approximately 250 parts per million of calcium and magnesium, as CaO and MgO. All of the flotation and conditioning was carried out in a WEMCO lab cell using 500 gram bowls. The following are the reagents used and their solution strength or weight per drop.

| | | |
|---|---|---|
| Sodium Hydroxide | NaOH | 10% |
| Potassium Hydroxide | KOH | 10% |
| Sodium Carbonate | $Na_2CO_3$ | 10% |
| Sodium Silicate | $Na_2SiO_3$ | 10% |
| Sodium Metasilicate | $Na_2MSiO_3$ | 10% |
| Potassium Chloride | KCl | 10% |
| Sodium Sulphide | $Na_2S$ | 2½% |
| Quebraccho | Que | 2½% |
| Sodium Hexametaphosphate | | 2½% |
| Lignins and Lignin Compounds Supplied by ITT Rayonier | | |
| 260L | 2½% | |
| RFC | 2½% | |
| 2080 | 2½% | |
| Orzan | 2½% Lignin supplied by Crown Zellerbach | |
| 633 | 2% Dispersant supplied by the American Cyanamide Company | |

Oleic Acid—0.03 grams per drop
Crude Oleic Acid—0.03 grams per drop
$P_4$—Tall Oil 0.03 grams per drop, supplied by Hercules, Inc.
$FA_2$—Tall Oil 0.03 grams per drop, supplied by Arizona Chemical
Fish Oil—Commercial 0.028 grams per drop
Cresylic Acid—Frother, not weighed
AF 65—Frother, supplied by American Cyanamid Company
Diesel Oil—0.024 grams per drop All of the test results are from open circuit testing. In some cases, only a single cleaner was used for comparative purposes. All of the silica present in the ores were treated as being present as kaolinite except where specifically stated, and the effectiveness of its rejection can be measured from the silica analysis. All of the examples were conducted at ambient temperatures covering both summer and winter temperatures with the temperature depending on the temperature of the water source, for example in the range of approximately 4° C. to 30° C. Where dilution of the pulp was carried out at the end of Stage III, pulp was dipped from the bowl, and water, raised to the same pH as the pulp, was added to the cell to obtain the requisite pulp density prior to rougher flotation. In the following series of examples the material treated was a low grade Arkansas Bauxite with the following average head analysis:

| $Al_2O_3$ | $SiO_2$ | $TiO_2$ | $FeO_3$ | L.O.I. |
|---|---|---|---|---|
| 48.5 | 15.0 | 2.0 | 7.2 | 26.5 |

EXAMPLE I

This example is a preferred embodiment of the invention.

Stage I: Grinding time 10 minutes at 50% solids. Reagents to mill—10 ccs. NaOH and 32 ccs. 2080; pH mill discharge-9.95.

Stage II: Pulp for grinding circuit transferred to lab WEMCO cell 500 gram bowl. pH in cell raised to 10.5 with NaOH. Pulp conditioned for 40 minutes at density of 25% solids.

Stage III: Added 20 drops $P_4$—raised pH to 10.5 with NaOH, conditioned for 5 minutes, diluted pulp to 17% solids, added three drops diesel oil and conditioned for additional 1.5 minutes, and followed by rougher flotation to produce a rougher concentrate and a rougher tailings.

Stage IV: The rougher tailings were conditioned in the same bowl for 30 minutes under the following conditions:
pH raised to 10.5 with NaOH
Reagents added; 2.0 ccs 2080 and 10 drops P$_4$
A scavenger float followed to produce a scavenger concentrate which was combined with the rougher concentrate and a scavenger tailings to waste.
The scavenger float time was 10 minutes Cleaning Circuit: The combined rougher and scavenger concentrates were cleaned three times at a pH of 10.5 and with the addition of 4 drops, 2 drops and 2 drops of P$_4$ at the end of the numbers 1, 2 and 3 cleaners, respectively.

The following metallurgy was obtained:

| Products % Wt. | Calculated % Al$_2$O$_3$ as Gibbsite | Chemical Analysis - Percent | | | | |
|---|---|---|---|---|---|---|
| | | Total Al$_2$O$_3$ | SiO$_2$ | Fe$_2$O$_3$ | TiO$_2$ | L.O.I. |
| Concentrate 50.9 | 47.8 | 52.1 | 5.1 | 10.1 | 2.9 | 29.8 |
| #3 Clnr. Tlg. 6.5 | 38.2 | 48.8 | 12.5 | 9.5 | 2.1 | 27.1 |
| #2 Clnr. Tlg. 8.5 | 31.4 | 49.7 | 21.5 | 3.4 | 1.5 | 23.9 |
| #1 Clnr. Tlg 13.9 | 25.6 | 47.8 | 26.1 | 2.7 | 1.2 | 22.2 |
| Scav. Tlg. 20.3 | 19.1 | 45.6 | 30.6 | 2.4 | 1.0 | 20.4 |
| 100.0 | | | | | | |

The outstanding differential float will be noted particularly in view of the grind of approximately 80% minus 500 mesh and without the use of either desliming or treated water.

In using my preferred group of alkaline agents, that is NaOH, KOH, and Na$_2$CO$_3$, it will be noted that each in itself is a dispersing agent, and on some materials may be used in the circuit without the addition of dispersants from other families such as the lignins, silicates and phosphates. Where I use NaOH or KOH or any combination of the two, my preferred pH range throughout all stages is 9.5 to 11.5. Where I use Na$_2$CO$_3$ in combination with NaOH and KOH, either individually or collectively my preferred pH range throughout all stages is 8.5 to 11.0. Where I use Na$_2$CO$_3$ alone my preferred pH range throughout all stages is 7.5 to 10.5. The application of the various families of dispersants in my invention is dependent upon the type of material to be treated and the final grade of concentrate desired. In the simplest application of the invention only the group of dispersing alkaline agents may be applied. My preferred family of dispersants, as distinguished from the group of alkaline dispersing agents, is the lignins, and to the inventor's knowledge this is the first time that such reagents have been applied to the separation of hydrated aluminum oxide minerals from kaolinite.

The optimum application of the lignins is in the first stage alone of the process, or in the first and second stages, and in the fourth stage. The lignins may be used as mixtures or replaced by, or used in combination with other families of dispersants such as the phosphates and silicates.

In the application of fatty acids to my process I have found that the broad range of oleic acids, crude oleic acids, tall oils and fish oils are applicable either singly or in various combinations. To obtain the optimum requires controlled laboratory testing using the various collectors from this family that are economically available. Although I have successfully complemented the fatty acids with frothers such as Cresylic acid and alcohol based frothers, normally the frothing characteristics of the fatty acids alone make them sufficient to produce a satisfactory froth. The time periods of conditioning are most important.

Stage II is a mechanical agitation conditioning stage carried out in the presence of an alkaline agent. The optimum time period may vary from a minimum of about two minutes to a maximum of about one hour. The reactions that take place during this stage are not fully understood. The surprising effect is that in following this stage the hydrated aluminum oxide minerals are highly activated and differentially flocculated by the collector in as little as two minutes contact time. Considering that the pulp is not deslimed, and the make-up water untreated, that is a most remarkable result.

Stage III is a mechanical agitation conditioning stage and optimum metallurgy is normally obtained within a maximum of 15 minutes conditioning time. The use of fuel oils, such as Diesel oil at the end of this stage is optional and not a requisite reagent in my process. As far as I have determined, it acts primarily as a froth modifier simplifying handling of the froth by causing the froth to breakdown more rapidly.

Prior to rougher flotation there is normally a pulp dilution step reducing the percent solids from the range of about 20 to 65% solids to about 14 to 18% solids. It is a mechanical agitation conditioning step and the time period of conditioning is 0.5 minute to about five minutes, followed by rougher flotation, producing a rougher concentrate and tailing.

Stage IV, prior to scavenger flotation is a mechanical agitation condition stage in the presence of collector and optionally additional alkaline agent or dispersing agent selected from the group of dispersing agents consisting of lignins, phosphates and silicates. The time period prior to scavenger flotation is in the range of about five minutes to 30 minutes.

On some materials Stage IV is omitted from the process as the economics of a scavenger float may not be justified.

Cleaning Circuit: The cleaning circuit normally consists of countercurrent flow of the cleaner tailings with a cleaner scavenger float on the number one cleaner tailings with the cleaner scavenger concentrate to number two cleaner circuit and the cleaner scavenger tailings to final tailings. The only reagents normally used are the alkaline agents for pH control and small additions of collector to the individual cleaner circuits.

EXAMPLE II

The following series of tests were carried out on the low grade Bauxite material as in Example I. The circuits and reagents were identical with the exception of the difference in the members of the family of dispersants used. These were lignins. 750 Grams of ore was ground for eight minutes in the lab rod mill with the addition of 12.0 ccs. of NaOH and 16 ccs. of the lignin used. The discharge pH from the mill was 10.2.

The pulp from the mill was transferred to the 500 gram WEMCO cell bowl and diluted to 25% solids; the pH was raised to 10.5 with NaOH and the pulp conditioned for 40 minutes. 20 Drops of $P_4$ was then added to the pulp, the pH adjusted to 10.5 with NaOH and conditioned for five minutes. The pulp was then diluted to 16% solids and a rougher concentrate produced by flotation. The pH of the rougher tailings was adjusted to 10.5 with NaOH and conditioned for 30 minutes with the addition of 10 drops $P_4$ and 1.0 ccs. of sodium metasilicate. A scavenger float followed with the scavenger tailings to final tailings and the scavenger concentrate combined with the rougher concentrate to form the feed to number one cleaning circuit. The cleaner circuit consisted of 2½ minutes conditioning of the combined concentrates at a pH of 10.5 with 4 drops of $P_4$ added at the end of the float, and additionally floated to complete the production of the cleaner concentrate.

The following tables show the results obtained:

| Lignin Description | Percent Weight in | | | Clnr. Conct. % Distribution |
| --- | --- | --- | --- | --- |
| | Clnr. Conct. | Clnr. Tlgs. | Scav. Tlgs. | $Al_2O_3$ as Gibbsite |
| Quebraccho | 62.2 | 14.0 | 23.8 | 74.7 |
| Orzan | 68.7 | 13.0 | 18.3 | 81.4 |
| 26OL | 70.3 | 12.4 | 17.3 | 82.4 |

| Lignin Description | Clnr. Conct. Chemical Analysis - Percent | | | | |
| --- | --- | --- | --- | --- | --- |
| | $Al_2O_3$ as Gibbsite | $SiO_2$ | $Fe_2O_3$ | $TiO_2$ | L.O.I. |
| Quebraccho | 43.7 | 7.1 | 9.0 | 2.5 | 31.7 |
| Orzan | 45.8 | 8.2 | 9.0 | 2.2 | 27.8 |
| 26OL | 45.9 | 8.3 | 8.5 | 2.2 | 28.0 |

The results show that all three different members of the Lignin family of dispersants as used in the invention produce an excellent differential float between the kaolinite and Gibbsite with the silica in the single cleaner concentrate reduced from a head value of 15% to 7.1 to 8.3% together with recoveries of the Gibbsite of 74.7 to 82.4% in open circuit. It will be noted that no fuel oil was used in this series of tests.

EXAMPLE III

This example shows the application of the invention at the upper end of the preferred pH range with the rougher and first cleaner float at a pH of 11.5 and then rougher scavenger float at a pH of 10.9. The material treated was the same as used in Examples I and II. 750 Grams of ore were ground in the lab rod mill for 10 minutes at 50% solids with the addition of 10 ccs. NaOH and 6.0 ccs. Que. The end pH was 9.3. The pulp was transferred to the WEMCO cell, diluted to 25% solids, the pH raised to 11.5 with NaOH and conditioned for 40 minutes. The end pH was 11.0. 20 drops of $P_4$ and 1.0 ccs $Na_2SiO_3$ were added to the pulp, the pH raised to 11.5 with NaOH, and the pulp agitation conditioned for 5 minutes. Three drops of Diesel Oil was added and conditioning continued for 1.5 minutes. The end pH was 11.4. The pulp was then diluted to 15% solids with make-up solution at a pH of 11.5 using NaOH and tap water. A rougher concentrate was then removed from the pulp and the rougher tailings at a pH of 10.9, was agitation conditioned for three minutes with the addition of 10 drops $P_4$ and 2.0 ccs., $Na_2SiO_3$. A scavenger concentrate was then removed from the pulp by flotation and combined with the rougher concentrate to form the first cleaner circuit feed. The combined concentrates were placed in the 500 gram WEMCO bowl, the pH raised to 11.5 with NaOH and agitation conditioned for 2.5 minutes prior to the first cleaner float. Following the initial part of the first cleaner float four drops of $P_4$ was added to the pulp, conditioned for 2.5 minutes, and the cleaner float completed to produce a first cleaner concentrate and a first cleaner tailings. The following metallurgy was obtained:

| Product | Wt. | Chemical Analyzis - Percent % | | | | |
| --- | --- | --- | --- | --- | --- | --- |
| | | $Al_2O_3$ | $SiO_2$ | $Fe_2O_3$ | $TiO_2$ | L.O.I. |
| #1 Clnr. Conct. | 66.9 | 52.2 | 8.2 | 8.1 | 2.5 | 29.0 |
| #1 Clnr. Tlgs. | 12.1 | 47.5 | 26.3 | 2.5 | 1.2 | 22.5 |
| Scav. Tlgs. | 21.0 | 46.5 | 28.2 | 2.5 | 1.1 | 21.7 |
| | 100.0 | | | | | |

*Note: The $Al_2O_3$ reported analysis in all Examples is obtained by difference.

EXAMPLE IV

In this example on the low grade Bauxite the circuit described in Example I was used with the major difference in reagents being the addition of 48 ccs. of KCl to the lab grinding mill in addition to NaOH and a lignin, RFC. Surprisingly, the KCl in combination with the other factors of the invention produced a higher grade concentrate at equivalent recovery of the Gibbsite. The following metallurgy was obtained:

The calculated percent $Al_2O_3$ as Gibbsite in the #1 Clnr. Conct. was 79.8.

| Product | Wt. | Chemical Analysis - Percent % | | | | |
| --- | --- | --- | --- | --- | --- | --- |
| | | $Al_2O_3$ | $SiO_2$ | $Fe_2O_3$ | $TiO_2$ | L.O.I. |
| #1 Clnr. Conct. | 68.0 | 52.4 | 7.6 | 8.9 | 2.4 | 28.6 |
| #1 Clnr. Tlg. | 12.9 | 48.9 | 24.8 | 2.8 | 1.2 | 22.3 |
| Scav. Tlgs. | 19.1 | 47.1 | 28.7 | 2.5 | 1.0 | 20.7 |
| | 100.0 | | | | | |

EXAMPLE V

In this example a four stage conditioning circuit is used with an alkaline agent only to the first three stages prior to rougher flotation. To the fourth stage, and prior to scavenger flotation an alkaline agent and dispersant were added to the rougher tails. The ore is Laterite.

Charge to Mill: 1200 grams of ore at 50% solids
Reagents to Mill: 23 ccs. NaOH
The pH of the pulp following grinding was 9.7
In Stage II the pH of the pulp was raised to 10.0 with NaOH and agitation conditioned for 30 minutes, with the pH at the end of the stage being 9.8.

In Stage III, the pH of the pulp was raised to 10.0 with NaOH, 24 drops of crude oleic acid added to the pulp, and conditioned for five minutes, following which the density of the pulp was reduced from about 35% solids to 14% solids, three drops of Diesel oil added to the pulp and conditioned for 1½ minutes prior to rougher flotation. Following the rougher float the rougher tails were adjusted to pH of 10.0 with NaOH, 1.0 ccs. of sodium metasilicate, and eight drops crude oleic acid added to the pulp, and the pulp conditioned for 15 minutes and a scavenger concentrate floated from the cell. The following metallurgy was obtained.

| Product | % Wt. | % SiO$_2$ |
|---|---|---|
| Rougher Concentrate | 60.2 | 4.45 |
| Scavenger Concentrate | 19.8 | 5.47 |
| Scavenger Tails | 19.8 | 13.8 |

EXAMPLE VI

Examples VI to IX inclusive are on treating a lateritic ore from Oregon containing hydrated aluminum oxide minerals in the form of Gibbsite. There may be other alumina oxide minerals present in minor amounts which have not as yet been identified. In applying the invention to this material, which is so radically different mineralogically from the low grade Arkansas Bauxites, it was found, surprisingly, that the identical circuit described in Example I gave excellent results. The only major difference in reagents was that crude oleic acid as the collector proved superior to Tall oil. In this example the ore was ground in the lab rod mill for 11.0 minutes with the addition of 20 ccs. NaOH and 8.0 ccs. Que. A 1000 gram charge was used. The pulp from the rod mill was transferred to the 500 gram WEMCO cell bowl, diluted to 32% solids and conditioned at a pH of 9.8 for 30 minutes. This stage was followed by 5 minutes conditioning with the addition of 19 drops of crude oleic acid and the pH raised to 10.0 with NaOH. Then three drops of Diesel oil were added to the pulp and the agitation conditioning continued for 1.5 minutes. The pulp was then diluted to 15% solids with tap water, adjusted to a pH of 10.0 with NaOH, and a rougher float followed to produce a rougher concentrate and tailing. Eight drops of crude oleic acid was then added to the rougher tailing, the pH adjusted to 10.0 with NaOH and the pulp agitation conditioned for 15 minutes prior to the scavenger float. This float produced a scavenger concentrate, which was combined with the rougher concentrate as the feed to number one cleaner circuit, and the tailing was a final tailing to waste. The combined concentrate was cleaned three times at a pH of 10.0 with the addition of four drops and two drops of crude oleic acid to the first and second cleaners, respectively. The following results were obtained:

| Product % Wt. | Calc. % Al$_2$O$_3$ As Gibbsite | Chemical Analysis - Percent | | | | |
|---|---|---|---|---|---|---|
| | | Al$_2$O*$_3$ | SiO$_2$ | Fe$_2$O$_3$ | TiO$_2$ | L.O.I. |
| Concentrate 57.1 | 39.0 | 40.8 | 2.1 | 27.7 | 6.0 | 23.4 |
| #3 Clnr. Tlg. 6.3 | 27.0 | 32.3 | 6.1 | 35.6 | 4.7 | 21.3 |
| #2 Clnr. Tlg. 7.1 | 21.8 | 29.9 | 9.5 | 36.0 | 4.2 | 20.4 |
| #1 Clnr. Tlg 11.5 | 17.1 | 28.2 | 13.1 | 35.1 | 3.7 | 19.9 |
| Scav. Tlg. 18.0 | 12.6 | 26.2 | 16.0 | 33.1 | 5.5 | 19.2 |
| 100.0 | | | | | | |

*Total Al$_2$O$_3$

The scavenger tailing contained 7.7% of the alumina as Gibbsite, and the concentrate, 74.2% of the alumina present as Gibbsite. This is outstanding open circuit metallurgy and illustrates the highly differential activation and flocculation of the aluminum oxide minerals.

EXAMPLE VII

A three stage conditioning circuit was used with no dispersants present in the pulp other than the alkaline agent and Na$_2$S. The mill ore charge weight was 720 grams; the % solids of grind 50.0 and the agitation conditioning and beginning of rougher float, 24% solids. Reagents to mill: 12 ccs. NaOH and 8 ccs. Na$_2$S, with no pulp dilution ahead of rougher flotation. Number 2 agitation conditioning stage was 21 minutes with the pH raised to 10.0 with NaOH. Number 3 agitation conditioning stage was firstly five minutes with the addition of 16 drops crude oleic acid followed by 2.5 minutes agitation conditioning with the addition of 12 drops Diesel oil. A rougher concentrate only was produced showing a good differential float of the Gibbsite and kaolinite with major depression of the iron minerals.

| Product % Wt. | Chemical Analysis - Percent | | | | |
|---|---|---|---|---|---|
| | Al$_2$O$_3$ | SiO$_2$ | Fe$_2$O$_3$ | TiO$_2$ | L.O.I. |
| Rougher Concentrate 80.9 | 35.7 | 4.5 | 31.7 | 6.2 | 21.9 |
| Rougher Tailing 19.1 | 24.6 | 11.7 | 41.8 | 4.5 | 17.4 |
| 100.0 | | | | | |

EXAMPLE VIII

In this example a four stage conditioning circuit is used with two alkaline agents to the mill in addition to a lignin, and no pulp dilution following the last agitation conditioning stage prior to rougher flotation.

Charge to Mill: 600 grams of ore at 50% solids.

Reagents to Mill: 6 ccs Na$_2$CO$_3$, 8 ccs. NaOH, and 12 ccs. RFC.

% Solids to number two agitation conditioning stage, 21.0. The number two agitation conditioning stage was 20 minutes with the pH adjusted to 10.0 with NaOH. Number three agitation conditioning stage was 5 minutes with the addition of 30 drops of crude oleic acid, and 5 ccs Na$_2$SiO$_3$. The rougher float followed with the production of a rougher concentrate and a rougher tailings. The rougher tailings were agitation conditioned in stage 4 for 15 minutes with the addition of 8 drops of crude oleic acid and the pH adjusted to 10.0 with NaOH. The scavenger float followed with the production of the scavenger tailings, and a scavenger concentrate that was combined with the rougher concentrate to form the first cleaner feed. Three cleaners were used with the pH maintained at 10.0 with NaOH. No other reagents were added. The following metallurgy was obtained:

| Product % Wt. | Chemical Analysis - Percent | | | | |
|---|---|---|---|---|---|
| | Al$_2$O$_3$ | SiO$_2$ | Fe$_2$O$_3$ | TiO$_2$ | L.O.I. |
| Concentrate 46.2 | 39.7 | 1.7 | 28.2 | 8.2 | 22.2 |
| #3 Clnr. Tlg. 8.2 | 30.3 | 6.1 | 38.6 | 5.2 | 19.4 |
| a#2 Clnr. Tlg. 12.8 | 29.8 | 8.2 | 38.6 | 4.7 | 19.2 |
| #1 Clnr. Tlg. 16.2 | 28.9 | 9.8 | 38.0 | 4.3 | 19.0 |
| Scav. Tlg. | | | | | |

| Product % Wt. | Chemical Analysis - Percent | | | | |
|---|---|---|---|---|---|
| | Al$_2$O$_3$ | SiO$_2$ | Fe$_2$O$_3$ | TiO$_2$ | L.O.I. |
| 16.6 | 28.3 | 12.8 | 36.5 | 3.7 | 18.7 |
| 100.0 | | | | | |

EXAMPLE IX

The ore used in this example was a Bauxite from Guyana. A three stage conditioning circuit was used. Although this ore sample may be considered as a high grade sample, the excellent differential flotation obtained is outstanding.

Charge to Mill: 500 grams ore at 50% solids.
Reagents to Mill: 6 ccs NaOH and 9 ccs HMP.
% solids to number 2 agitation conditioning stage, 17.5.

The number two agitation conditioning stage was 20 minutes with the addition of 12.5 ccs Que. and the pH adjusted to 10.0 with NaOH. Number 3 agitation conditioning stage was 5 minutes with the addition of 20 drops Oleic acid and a pH of 9.8, followed by flotation. A rougher tailing was produced which was a final tailing and a rougher concentrate that was cleaned three times with no pH adjustment and with the addition of three drops of oleic and two drops of the frother OT* to the first and second cleaners respectively. The following metallurgy was obtained:

| Product % Wt. | Chemical Analysis - Percent | | |
|---|---|---|---|
| | SiO$_2$ | Fe$_2$O$_3$ | TiO$_2$ |
| Concentrate 55.4 | 1.2 | 5.4 | 2.1 |
| #3 Clnr. Tlg. 10.7 | 2.8 | 7.1 | 2.7 |
| #2 Clnr. Tlg. 10.2 | 4.7 | 6.3 | 2.8 |
| #1 Clnr. Tlg. 8.2 | 7.1 | 5.3 | 2.8 |
| Scav. Tlg. 15.5 | 8.7 | 5.2 | 2.7 |
| 100.0 | | | |

Note: The L.O.I.'s were not run on these samples, and thus the Al$_2$O$_3$'s could not be calculated.

*Frother OT is supplied by American Cyanamid Company.

EXAMPLE X

The ore used in this example was a low grade Bauxite from Australia analyzing approximately 18% silica with part of the silica being present as silica grains in addition to the silica being present as a silicate in Kaolinite.

The excellent differential float of the hydrated Al$_2$O$_3$ minerals with the depression of the silica and silicate minerals will be noted.

Charge to Mill: 700 grams at 50% solids.
Reagents to Mill: 10 ccs NaOH and 5.5 ccs Que.
pH of pulp following grinding 10.2.

Stage II agitation conditioning stage was 35 minutes with the initial pH raised to 10.3 with NaOH and the addition of 12.0 ccs. Que.

Stage III agitation conditioning stage was 3.0 minutes with the addition of 12 drops P$_4$ and 2.0 ccs. sodium metasilicate. The rougher float was 7½ minutes. The rougher concentrate was cleaned once at a pH of 10.3 and with the addition of 10 drops P$_4$. The following metallurgy was obtained.

| Product and % Wt. | Chemical Analysis - Percent | | | | |
|---|---|---|---|---|---|
| | Al$_2$O$_3$ | SiO$_2$ | Fe$_2$O$_3$ | TiO$_2$ | L.O.I. |
| #1 Cleaner Conct. 61.1 | 49.3 | 4.4 | 17.1 | 1.9 | 27.3 |
| #1 Cleaner Tails 9.3 | 37.6 | 26.1 | 13.6 | 2.2 | 20.6 |
| Rougher Tails 29.6 | 27.8 | 45.9 | 10.1 | 1.6 | 14.7 |
| 100.0 | | | | | |

The following Examples XI and XII were carried out on a bauxite from Arkansas and are examples of the application of the invention to the higher end of the pH range.

In both examples 1000 gram charges were used and the grinding time in the laboratory rod mill was 18 minutes.

EXAMPLE XI

In this example, 14 ccs of NaOH and 38 ccs of Que. were added to the rod mill and the grinding carried out at 50% solids. The pH of the pulp was 9.9. Following the rod mill grinding, the pulp was transferred to the WEMCO cell and conditioned for 30 minutes at a beginning pH of 12.2. The conditioning time was 30 minutes and the end pH was 11.8. At the end of this Stage II, 45 drops of P$_4$ and 15 ccs of Na$_2$SiO$_3$ were added to the pulp. The pH was raised to 12.2 and the pulp conditioned for an additional 30 minutes. The pulp was then diluted to approximately 17% solids by the removal of part of the pulp from the cell and replacement of the removed pulp was made with water adjusted to a pH of 12.2 with sodium hydroxide. A rougher float was then made and the rougher concentrate cleaned twice following the rougher flotation. The pH of the pulp following rougher flotation was lowered with sulfuric acid to 10.7 and 12 drops of P$_4$ and 3 ccs sodium silicate added to the pulp and conditioned for 15 minutes prior to the rougher scavenger float. The rougher scavenger concentrate was kept separately.

In the following Table showing the metallurgical results, all of the silica is shown to be in the form of Kaolinite, the silica analysis only is shown, to demonstrate the differential floatability of the Gibbsite and the Kaolinite.

| PRODUCT | % WT. | % SiO$_2$ |
|---|---|---|
| #2 Clnr. Conct. | 33.7 | 4.2 |
| #2 Clnr. Tlgs. | 10.7 | 11.2 |
| #1 Clnr. Tlgs. | 20.7 | 17.1 |
| Rghr. Scav. Conct. | 3.1 | 14.8 |
| Rghr. Scav. Tlgs. | 31.8 | 23.0 |
| | 100.0 | |

EXAMPLE XII

In this example, the reagents to the rod mill were 14 ccs. NaOH and 40 ccs. Que. and the pH of the pulp on discharging from the rod mill was 10.1.

Following transference of the rod mill pulp to the WEMCO cell, the pH of the pulp was raised to 12.5 with NaOH and conditioned for 30 minutes. At the end of this stage II, 42 drops of P$_4$ were added to the pulp, the pH was again raised to 12.5 and conditioned for 6 minutes prior to dilution and rougher flotation*.

*Note: In this example, a rougher scavenger float was not included in the circuit used.

The following metallurgy was obtained, again illustrating the highly differential float between the Kaolinite and Gibbsite. The upper end of the pH range is about 13.0.

| PRODUCT | % WT. | % SiO$_2$ |
| --- | --- | --- |
| #2 Clnr. Conct. | 41.5 | 6.0 |
| #2 Clnr. Tlgs. | 10.7 | 13.8 |
| #1 Clnr. Tlgs. | 17.3 | 18.1 |
| Rghr. Tlgs. | 30.5 | 21.1 |
|  | 100.0 |  |

The invention has been described herein with reference to certain preferred embodiments. However, as obvious variations thereon will become apparent to those skilled in the art, the invention is not considered to be limited thereto.

What I claim is:

1. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of a member selected from the group consisting of a selected dispersing agent, alkaline dispersing agent, and mixtures thereof, in controlled amounts to effectively and beneficially disperse the solids contained in said pulp; subsequently subjecting the said pulp to a mechanical agitation conditioning stage in which the said pulp is mechanically agitation conditioned in the presence of at least an alkaline dispersing agent at an optimum pH point within the range of about 9.3 to 13.0 for a sufficient period of time to precipitate deleterious salts from the said pulp and further beneficially affect the surfaces of the said aluminum oxide minerals; subsequently subjecting the said mechanically agitation conditioned pulp to a further mechanical agitation conditioning stage at an optimum pH point in the range of about 9.3 to 13.0 and in the presence of a differential activating and flocculating agent comprising one or more oxyhydryl anionic collectors including at least one or more fatty acids selected from the group consisting of oleic acid, crude oleic acid, tall oils, fish oils and mixtures thereof, to activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

2. The process according to claim 1 wherein potassium chloride is additionally added to said pulp at any stage prior to said flotation.

3. The process according to claim 1 wherein the said rougher tailings are conditioned in at least one mechanical agitation conditioning circuit in the presence of an activating and flocculating agent comprising one or more oxyhydryl anionic collectors; subsequently subjecting the said agitation conditioned rougher tailings to flotation to produce a scavenger concentate enriched in the said aluminum oxide minerals and scavenger tailings further impoverished in the said aluminum oxide minerals.

4. The process according to claim 3 wherein an alkaline dispersing agent selected from the group consisting of sodium hydroxide, potassium hydroxide, sodium carbonate, and mixtures thereof, is added to said mechanical agitation conditioning circuit.

5. The process according to claim 3 wherein a dispersing agent selected from the group consisting of lignins, phosphates, silicates and mixtures thereof, is added to said mechanical agitation conditioning circuit.

6. The process according to claim 3 wherein the combination of an alkaline dispersing agent selected from the group consisting of sodium hydroxide, potassium hydroxide, sodium carbonate, and mixtures thereof, and a dispersing agent selected from the group consisting of lignins, phosphates, silicates, and mixtures thereof, is added to said mechanical agitation conditioning circuit.

7. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of an alkaline dispersing agent selected from the group consisting of sodium hydroxide, potassium hydroxide, and mixtures thereof to effectively and beneficially disperse the solids contained in the said pulp and adjust the pH of the said pulp to an optimum pH point within the pH range of about 9.3 to 12.5; subsequently subjecting the said pulp to mechanical agitation conditioning at an optimum pH point within the pH range of about 9.5 to 13.0 and for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the range of about 9.5 to 13.0 and in the presence of at least an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

8. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of an alkaline dispersing agent selected from the group consisting of sodium carbonate in combination with sodium hydroxide or potassium hydroxide or mixtures thereof to effectively and beneficially disperse the solids contained in said pulp and adjust the pH of the said pulp to an optimum pH point within the pH range of about 9.3 to 13.0; subsequently subjecting the said pulp to mechanical agitation conditioning at an optimum pH point within the pH range of about 9.3 to 13.0 and for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the pH range of about 9.3 to 13.0 and in the presence of an agent selected from the group of fatty acids to differentially activate and flocculate the said aluminum oxide minerals, subsequently subjecting the said conditioned pulp to flotation to produce a rougher concentrate enriched in the said aluminum oxide minerals and rougher tailings impoverished in the said aluminum oxide minerals.

9. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of an alkaline dispersing agent selected from the group consisting of sodium carbonate in combination with sodium hydroxide, sodium carbonate in combination with potassium hydroxide, and sodium carbonate in combination with sodium hydroxide and potassium hydroxide and a dispersing agent selected from the group consisting of lignins, phosphates, silicates, and mixtures thereof, to effectively and beneficially disperse the solids contained in said pulp, and adjust the pH of said pulp to an optimum pH point within the pH range of about 9.3 to 13.0; subsequently subjecting the said pulp to mechanical agitation conditioning at an optimum pH point within the pH range of about 9.3 to 13.0 and for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the pH range of about 9.3 to 13.0 and in the presence of an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

10. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of a dispersing agent selected from the group consisting of lignins, phosphates, silicates, and mixtures thereof to effectively and beneficially disperse the solids contained in the said pulp; subsequently subjecting the said pulp to mechanical agitation conditioning at an optimum pH point within the pH range of about 9.3 to 13.0 in the presence of an alkaline agent selected from the group consisting of sodium hydroxide, potassium hydroxide, mixtures thereof, or sodium carbonate in combination with sodium hydroxide or potassium hydroxide or mixtures thereof, for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the pH range of about 9.3 to 13.0 and in the presence of an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

11. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of an alkaline dispersing agent comprising sodium hydroxide and at least one dispersing agent selected from the family of lignins and wherein the pH of the said pulp discharging from the said wet grinding circuit is maintained by the said sodium hydroxide within a pH range of about 9.5 to 13.0 to effectively and beneficially disperse the solids contained in the said pulp; subsequently subjecting the said pulp to mechanical agitation conditioning at an optimum pH point within the pH range of about 9.5 to 13.0, such pH being maintained with sodium hydroxide and for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the range of about 10.0 to 13.0, such pH being maintained with sodium hydroxide, and in the presence of an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

12. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size and form a resulting pulp, and is carried out in the presence of a dispersing agent selected from the group consisting of lignins, phosphates, silicates, and mixtures thereof, and an alkaline dispersing agent selected from the group consisting of sodium hydroxide, potassium hydroxide, and mixtures thereof to effectively and beneficially disperse the solids contained in the said pulp; subsequently subjecting the said pulp to mechanical agitation conditioning at an optimum pH point within the pH range of about 9.5 to 13.0 and for a sufficient period of time to precipitate deleterious salts from the said pulp and further beneficially affect the surfaces of the said aluminum oxde minerals; subsequently subjecting the said mechanically agitation conditioned pulp to a further stage of mechanical agitation conditioning at an optimum pH point within the range of about 9.5 to 13.0 and in the presence of at least an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

13. A process for the concentration by flotation of hydrated aluminum oxide minerals from a hydrated aluminum oxide bearing raw material comprising: subjecting the said raw material to at least three stages of conditioning prior to rougher flotation, the said at least three stages of conditioning comprising: a wet grinding circuit in which the said raw material is reduced to flotation feed size, and is carried out in the presence of a dispersing agent selected from the group consisting of lignins, phosphates, silicates, and mixtures thereof to effectively and beneficially disperse the solids contained in the said pulp; subsequently subjecting the said pulp to mechanical agitation conditioning at an optimum pH point within the pH range of about 9.3 to 13.0 in the presence of an alkaline agent selected from the group consisting of sodium carbonate in combination with sodium hydroxide, sodium carbonate in combination with potassium hydroxide, and sodium carbonate in combination with sodium hydroxide and potassium hydroxide, and for a sufficient period of time to precipitate deleterious salts from the said pulp and further beneficially affect the surfaces of the said aluminum oxide minerals; subsequently subjecting the said mechanically agitation conditioned pulp to a further stage of mechanical agitation conditioning at an optimum pH point within the range of about 9.3 to 13.0 and in the presence of at least an agent selected from the group of fatty acids to differentially activate and flocculate the said aluminum oxide minerals; subsequently subjecting the said conditioned pulp to flotation to produce a rougher concentrate enriched in the said aluminum oxide minerals and rougher tailings impoverished in the said aluminum oxide minerals.

* * * * *